United States Patent
King et al.

(10) Patent No.: US 12,265,815 B2
(45) Date of Patent: Apr. 1, 2025

(54) CONDITIONAL UPDATE RECOMMENDATIONS BASED ON LOCAL SYSTEM STATE

(71) Applicant: Red Hat, Inc., Raleigh, NC (US)

(72) Inventors: William Trevor King, Olympia, WA (US); Douglas Richard Hellmann, Atlanta, GA (US); Scott C. Dodson, Raleigh, NC (US); Benjamin Michael Parees, Raleigh, NC (US); Lalatendu Shishusankar Mohanty, Boston, MA (US); Vadim Pavlovich Rutkovsky, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 63 days.

(21) Appl. No.: 17/727,534

(22) Filed: Apr. 22, 2022

(65) Prior Publication Data

US 2023/0342140 A1    Oct. 26, 2023

(51) Int. Cl.
| | | |
|---|---|---|
| *G06F 8/65* | (2018.01) | |
| *G06F 8/656* | (2018.01) | |
| *G06F 16/21* | (2019.01) | |
| *G06Q 30/02* | (2023.01) | |
| *H04L 9/40* | (2022.01) | |

(52) U.S. Cl.
CPC ............... *G06F 8/65* (2013.01); *G06F 8/656* (2018.02); *G06F 16/212* (2019.01); *G06Q 30/02* (2013.01); *H04L 9/40* (2022.05)

(58) Field of Classification Search
CPC ...... G06Q 30/02; G06Q 10/06; G06F 16/212; G06F 8/656; G06F 8/65; H04L 9/40; H04L 67/10
See application file for complete search history.

(56) References Cited

U.S. PATENT DOCUMENTS

| | | | |
|---|---|---|---|
| 7,191,435 B2 | 3/2007 | Lau et al. | |
| 8,209,564 B2 | 6/2012 | Vidal et al. | |
| 8,402,452 B2 | 3/2013 | Baratti et al. | |
| 10,310,842 B1 | 6/2019 | Miller et al. | |
| 10,579,371 B2 | 3/2020 | Agarwal et al. | |
| 11,029,938 B1 | 6/2021 | Sethi et al. | |
| 11,038,784 B2 | 6/2021 | Nickolov et al. | |
| 11,237,818 B1* | 2/2022 | Bross | G06F 8/65 |
| 2005/0132350 A1* | 6/2005 | Markley | G06F 8/65 717/174 |
| 2005/0273779 A1* | 12/2005 | Cheng | H04L 9/40 717/174 |

(Continued)

OTHER PUBLICATIONS

Ludwig et al., CN 104756076, (translation), Feb. 22, 2019, 14 pgs <CN_104756076.pdf>.*

(Continued)

*Primary Examiner* — Tuan A Vu
(74) *Attorney, Agent, or Firm* — Womble Bond Dickinson (US) LLP

(57) ABSTRACT

Processing logic may obtain a version of software that is running on a client. Processing logic may obtain a second version of the software which is an update to the version of software that is running on the client. Processing logic may send the second version to the client with one or more conditions that are associated with the second version, for the client to determine whether or not to update to the second version.

20 Claims, 6 Drawing Sheets

(56) References Cited

U.S. PATENT DOCUMENTS

| | | | | |
|---|---|---|---|---|
| 2012/0253990 | A1* | 10/2012 | Skala | G06Q 30/02 |
| | | | | 370/352 |
| 2014/0101647 | A1 | 4/2014 | Huang | |
| 2015/0143355 | A1* | 5/2015 | Tingstrom | H04L 67/10 |
| | | | | 717/170 |
| 2017/0255885 | A1* | 9/2017 | Whiteside | G06Q 10/06 |
| 2018/0351991 | A1* | 12/2018 | Jones | H04L 63/1433 |
| 2021/0011700 | A1 | 1/2021 | Aderton et al. | |
| 2021/0034776 | A1* | 2/2021 | Landman | G06F 16/212 |

OTHER PUBLICATIONS

Kelly NP, CN 104380302, (translation), Oct. 20, 2017, 12 pgs <CN_104380302.pdf>.*

JP 6667430, (translation), Mar. 18, 2020, 23 pgs <JP_6667430.pdf>.*

* cited by examiner

CONDITIONAL UPDATE RECOMMENDATIONS BASED ON LOCAL SYSTEM STATE

TECHNICAL FIELD

Aspects of the present disclosure relate to software updates, and more particularly, to a conditional recommendation for a software update based on a local attribute of a client.

BACKGROUND

Computing devices may execute instructions that are grouped together as a computer program to perform one or more related actions. Computing devices may be communicatively coupled to each other over a network, which may include electrical or optical wiring, wireless radio-frequency transceivers, or other network infrastructure. The computing devices may communicate with each other over the network, using various communication protocols.

Developers may update existing software for a variety of reasons such as, for example, to add new functionality, address security concerns, fix bugs, or a combination thereof. Developers may assign a version number to software (e.g., an application or suite of applications), to keep a history of changes to the software. When a device updates its software, the version number of the software may be incremented to indicate the new version of the software that has been installed on the device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
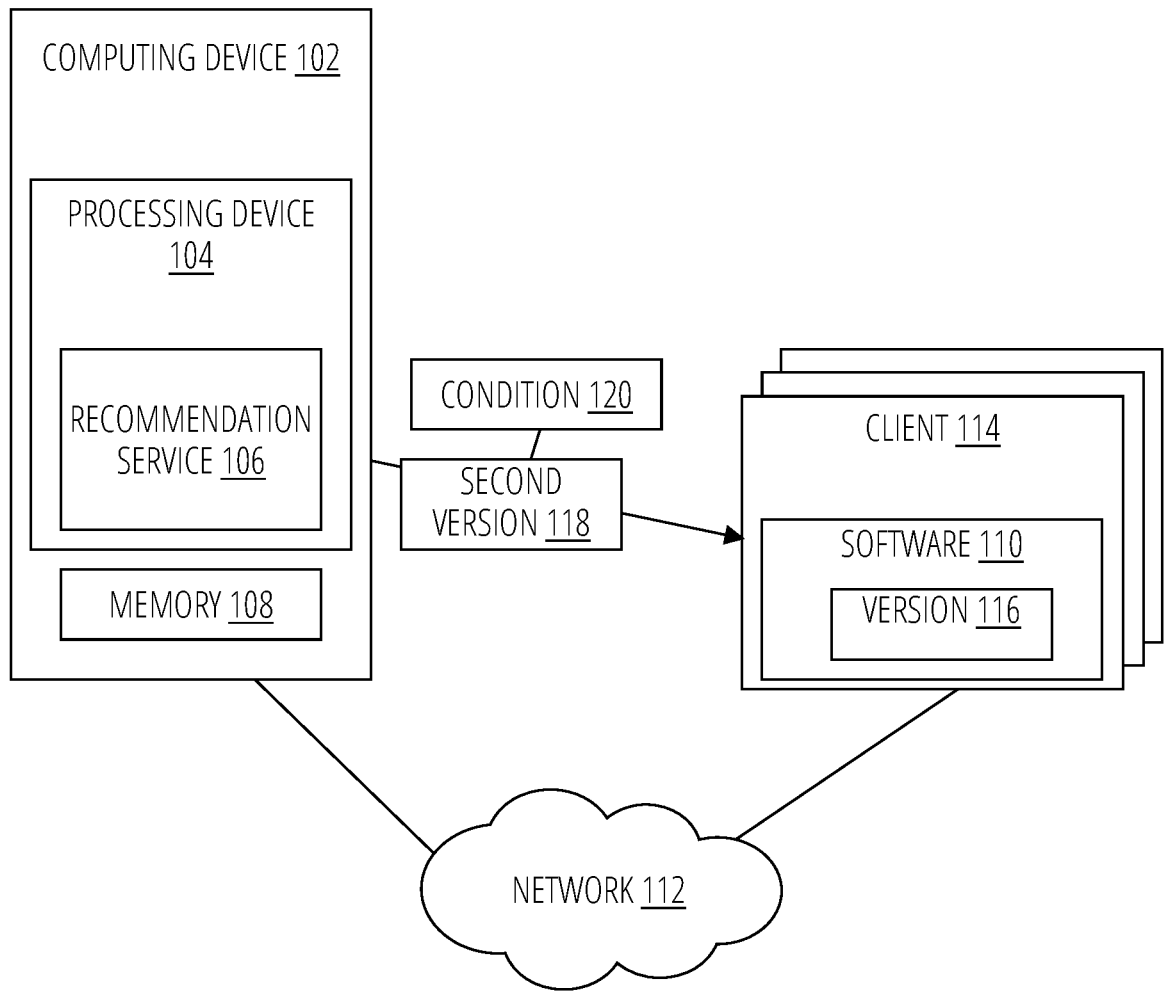
FIG. 1 shows a block diagram of an example computing device that may provide a recommendation for a software upgrade, in accordance with some embodiments.

A client may include one or more applications, virtual machines, services, or a combination thereof, that reside on one or more computing devices. The client may seek to update its software from its current version to a newer version. In some cases, multiple software versions may be available for the client to download and install. Each client may have a unique set of attributes that may differ from one client to another. Further, clients may have known or predicted reactions to a given software update, which may depend on the attributes of the client.

For example, one client may be hosted across a large number of nodes on a cloud platform 'X'. A second client may be hosted on a different cloud platform 'Y', across a much smaller number of nodes. The clients may have different operating systems, different software versions, different CPU architectures, or other different attributes. Data may indicate that clients with platform 'X' may be predisposed to react negatively to software update to version 1.0.1, while a client on cloud platform 'Y' does not have a negative response to the same software update.

Given the high number of different attributes that a client may have, and the potential security risks of sharing some attributes, it may be difficult for a software update recommendation service to tailor software update recommendations to a given client.

In conventional systems, a recommendation service may provide available software versions to a client. For example, the client may indicate to the recommendation service that the client is currently running version 1.0.0 of software. The recommendation service may determine that version 1.0.1 is available. Such a recommendation, however, is not tailored to the unique attributes of that client, which exposes the client to taking an uninformed risk when performing the software update. Further, given the many possible variations of attributes such as platform, configuration, drivers, and node configuration, or other attributes, the remote service would have a difficult task to create a single set of unconditional update recommendations that fit the entire deployed base of clients. Without the ability to customize recommendations based on local system attributes, conventional systems are to balance the risk of making a software update recommendation that is too broad for some clients, with the risk of making their software update recommendations too narrow for other clients.

Aspects of the disclosure address the above-noted issues and other deficiencies by processing logic that may provide recommendations for software updates with risk conditions that are associated with possible client-side attributes. In one aspect, processing logic may obtain the current version of software running on a client. Processing logic may obtain the available software updates for that software version, and risk conditions (e.g., client attributes) that may be associated with a given software update. Processing logic may send the available software updates and the respective risk conditions to the client. The client may use this information to determine which software update to perform in view of its attributes.

Such a recommendation service need not burden itself with understanding the unique attributes of each client. The recommendation service may inform the client of these risk conditions, so that they may analyze each conditional risk in view of its own attributes to determine which software update to perform. The recommendation service allows users to link documentation around a recommendation, so that clients may assess why the recommendation service provided a given risk condition. Clients may keep these attributes to themselves, thereby maintaining possibly sensitive information as private and allowing risk assessment to include conditions which may not be available or visible to the recommendation service. For example, detailed networking configuration may be too sensitive and voluminous to export to the remote recommendation service, but clients may still access it when assessing risks. A client may opt out of exporting local information entirely, or operate in a restricted network or under privacy policies that are against sharing local client information. The conditional risks associated with update recommendations, on the other hand, may be easily distributed to all systems, even those on restricted networks, and evaluated locally against system attributes that do not leave the client.

Processing logic may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Processing logic may perform server-side operations of a recommendation service or client-side operations of selecting and performing a software update, or both.

FIG. 1 shows a block diagram of an example computing device 102 that may provide a recommendation for a software upgrade, in accordance with some embodiments. Computing device 102 includes a processing device 104 and a memory 108. Memory 108 may include volatile memory devices (e.g., random access memory (RAM)), non-volatile memory devices (e.g., flash memory) and/or other types of memory devices. Computing device 102 may include processing logic such as processing device 104.

Processing device 104 includes a recommendation service 106. The recommendation service 106 may comprise one or more computer applications that run on processing device 104 to perform operations described herein.

Client 114 may include one or more software components that may be hosted on another computing device. In some embodiments, client 114 may be distributed over multiple computing devices. In some examples, client 114 may include a group of nodes that may be hosted on virtual machines. The group of nodes may be understood as a cluster.

The processing device 104 may obtain a version 116 of software 110 that is running on a client 114. For example, the client 114 and computing device 102 may be communicatively coupled over a computing network 112. The client 114 may poll the computing device 102 with its current software version 116 to request one or more available software versions to upgrade to, such as second version 118.

The processing device 104 may obtain second version 118 of the software 110 which is an update to the version 116 of software 110 that is running on the client 114. Processing device 104 may send the second version 118 to the client 114 with one or more conditions 120 that are associated with the second version 118, for the client to determine whether or not to update to the second version.

In some examples, one or more conditions 120 may include a conditional statement such as "if A, then B" or "if not A, then B". For example, a condition may state "if client has attribute 'X', then do not install this version", or "if client has attribute 'Y', then client should install this version".

In some examples, the one or more conditions 120 may indicate a risk of updating to the second version 118 by the client. For example, a condition may warn that "if condition X is applicable to the client, then client should not install this version". In some examples, the one or more conditions 120 may indicate a benefit of updating to the second version by the client. For example, a condition may indicate that "if condition X is applicable to the client, then client should install this version". In some examples, the one or more conditions 120 may include an inverse condition. For example, a condition may state "if condition X is not applicable to the client, then client should not install this version", or "if condition X is not applicable to the client, then the client should install this version". Further, the one or more conditions 120 may include a combination of conditions or attributes. For example, a condition may state that "if attribute X or Y are matched to a client, then the client should not install this version).

In some examples, the processing device 104 may send a plurality of versions to the client. For example, the processing device 104 may obtain each version of software 110 that is available as an update from the current version 116 of the software 110. Processing device 104 may send the version numbers to client 114 with each of the conditions 120, over the network 112. The one or more conditions 120 may be determined through various operations such as, for example, through client feedback, user input, or a combination thereof.

In some examples, processing device 104 may send each available version (such as version 118) to client 114 as a graph. The graph may comprise a node for each software version, and edges between nodes that represent a valid path for transitioning from one version of the software to another version of the software. Each edge on the graph may be associated with a risk condition, such as one or more conditions 120.

As discussed, one or more conditions 120 may include one or more attributes that are local or specific to client 114. As discussed, attributes may vary from one client to another. In some examples, the one or more conditions 120 may include a number of nodes or a node ID of the client 114. For example, client 114 may be distributed over a plurality of nodes. The second version 118 may have a known or predicted risk for clients with greater than a threshold number of nodes. Similarly, the one or more conditions 120 may indicate that clients with node ID 'Y' have responded negatively (e.g., slowing down, crashing, performing unexpectedly, becoming unresponsive, etc.). Alternatively, a developer may indicate that the second version 118 is beneficial for clients 114 with greater than 'N' nodes, or with node ID 'Z'. Thus, client 114 may evaluate whether that risk or benefit is relevant to client 114 and perform or reject the software update based on the assessment.

One or more conditions 120 may include a platform provider of the client. The platform provider may indicate a type of cloud platform (e.g., AWS, Azure, or other cloud platform) or a version of the platform, or both. Further, a client may have settings configured for a cloud platform in a particular manner. The one or more conditions may also refer to settings of its cloud platform. For example, the one or more conditions 120 may indicate that clients hosted through a platform provider 'A' may be vulnerable to a threat and should therefore go ahead and perform an update to second version 118 which may address this threat. Alternatively, the one or more conditions 120 may indicate that clients with some settings on platform provider 'B' have responded negatively to the second version 118. Thus, the client 114 may evaluate its own platform provider in view of the one or more conditions 120, to determine whether or not to install second version 118.

The one or more conditions 120 may include a dynamic attribute of the client. For example, the one or more conditions 120 may indicate a particular live configuration, a runtime state, one or more invalid DNS entries, a client behavior, a CPU state, a memory state, a network throughput, or other client attribute that may change from one moment to another. In some examples, the dynamic attributes may include a use of the client (e.g., when it performs certain tasks, what tasks it performs, etc.). The client may monitor its own dynamic attributes repeatedly to dynamically monitor if the conditions 120 apply to the client. The client may decide whether or not to install the second version 118 and adjust its decision according to whether its own dynamic attributes match conditions 120. In some examples, static attributes which are less prone to change, such as CPU architecture, platform provider, client hardware or software, or other client attributes discussed in other sections, are not re-evaluated repeatedly.

In some examples, the one or more conditions 120 may include hardware attributes such as, for example, a CPU architecture of the client, and whether or not the hardware attribute is positively or negatively associated with the second version 118. In some examples, as described, the one or more conditions 120 are set in view of user input. For example, a developer, administrator, or other user may add one or more conditions 120 to a given version update, with an indication of whether this is a positive association or a negative association.

In some examples, condition 120 may include hardware, software, a hardware setting, a software setting, or combination thereof, that may affect how a client reacts to a software upgrade. In some examples, condition 120 may include any attribute described in the present disclosure. In some examples, condition 120 may include a client attribute that is not described in the present disclosure. In some examples, condition 120 includes at least one of the attributes described in the present disclosure.

In some examples, the client does not share client attributes with the computing device 102. In some aspects, as described, the client may update the software 110 to the second version 118, in response to the one or more conditions 120 not being present on the client. For example, if the one or more conditions 120 are negatively associated with the second version 118, the client may choose to not update to the second version 118. In some aspects, as described, the client may update the software 110 to the second version 118, in response to the one or more conditions 120 being present on the client, for example, if the one or more conditions 120 are positively associated with the second version 118.

The client may involve a user (e.g., an administrator) in the update process. The client may send a notification (e.g., a digital message, an email, an alert, etc.) to a user that indicates the available software versions (e.g., second version 118) to update to, as well as the one or more conditions 120 that may be positively or negatively associated with each of the available versions. The user may select whether or not the client is to perform an update to the second version. In some examples, a client may be configured to perform the update without input from a user (e.g., automatically).

In some examples, a client may be configured to automatically perform an update in response to the client having an attribute that matches the one or more conditions 120 that are positively associated with the second version 118, or in response to the client not having an attribute that matches the one or more conditions 120 that are negatively associated with the second version 118. Further, the client may be configured to send the notification to the user, in response to when the one or more conditions 120 which are negatively associated to the second version 118 are present on the client. In such a manner, the client may automatically perform an update when no adverse risk is indicated, or when a benefit is indicated. If, however, an adverse risk is present, then the client may involve an admin to decide on whether to install the second version 118.

Figure 2:
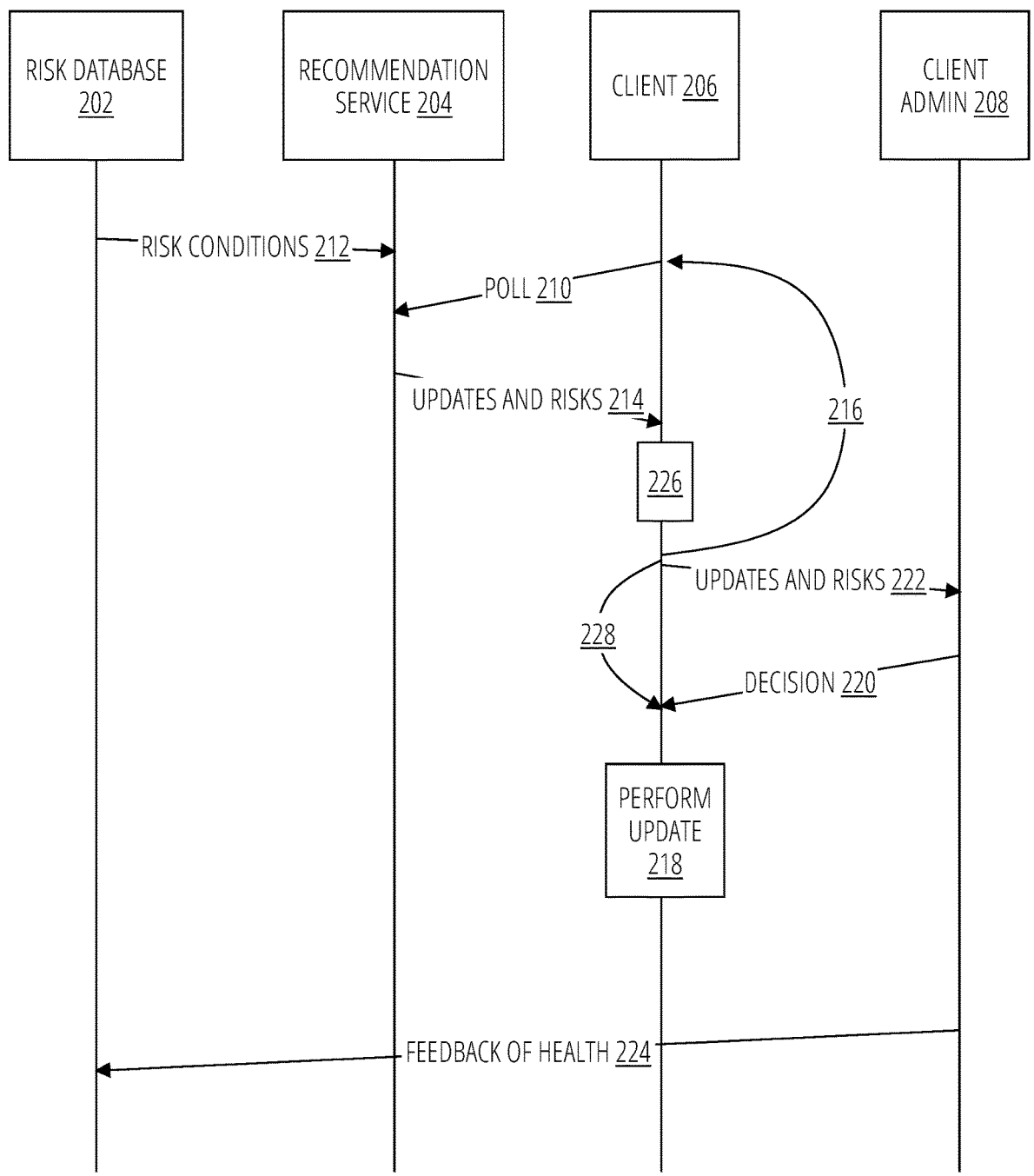
FIG. 2 shows a sequence diagram of an example workflow for performing a software update with a recommendation, in accordance with some embodiments.

FIG. 2 shows a sequence diagram of an example workflow for performing a software update with a recommendation, in accordance with some aspects. A risk database 202 may, at operation 212, store and provide available software updates and associated risk conditions to recommendation service 204. Although shown separately in this illustration, risk database 202 may, in some examples, be integral to recommendation service 204. A risk condition may be used interchangeably with a condition in the present disclosure. The risk database 202 may store the available software updates and associated risk conditions (e.g., the client attributes) as a graph (e.g., see FIG. 3). It should be understood that a risk condition may include an attribute that is associated with an update from one software version to a second software version. The risk condition may indicate a negative association (e.g., a risk of adverse effect). The risk condition may also indicate a positive association (e.g., that clients with attribute 'A' should take this software update). In some examples, a risk condition may include an environmental condition, for example, a temperature measured by the client, a location, etc.

As described, the risk condition for each software update may, in some examples, be determined by a user (e.g., a developer or other user), or based on client feedback which may be provided by client administrator 208 at operation 224, and stored in risk database 202.

For example, a client administrator 208 may review logs on one or more clients and determine that a given software update (e.g., to version 'A') has a negative effect on some clients (e.g., with attributes X, Y, or Z). The client administrator 208 may, at operation 224, provide client feedback to the risk database 202, indicating that a client has experienced an adverse response to a given update (e.g., to version 'A'). The risk database 202 may store the risk condition (e.g., clients with attribute 'Y' may be at risk to version 'A'). As such, the risk conditions may be improved over time to reflect real client feedback.

In some examples, an administrator or the recommendation service 204 may indicate that clients with some attributes should update to a particular version (e.g., a positive association). For example, a 'patch' or 'hotfix' version may be targeted to upgrading from a given version, for clients that have a particular attribute or set of attributes (e.g., clients with attribute 'Z' should install version 'B').

As discussed, risk conditions could include dynamic or static client attributes. The risk conditions may depend on local, possibly sensitive states. For example, risk conditions may include a cloud provider, a network configuration, enabled plugins on a client, the presence of particular kinds of invalid DNS entries, or other attributes such as those described in other sections. Numerous local client state metrics or client configurations may be stored as risk conditions in the risk database 202.

In some examples, the risk database 202 may store or update the risk conditions periodically, or in response to obtaining new information from a user or a client, or a combination thereof. In some examples, the recommendation service 204 may obtain the risk conditions at operation 212 periodically, or in response to receiving a request from a client 206 for a recommendation, or a combination thereof.

In some examples, at operation 210, the client 206 may poll the recommendation service 204 to provide available software updates in view of the current software version running on client 206. For example, client 206 may communicate to recommendation service 204 that client 206 is running software version 1.0.1. Recommendation service 204 may, at operation 214, provide the client 206 with available software versions to update from the current version of client 206, along with the attributes that are negatively or positively associated with each of the available updates, if such conditions exist. In some examples, as shown with operation 216, the client 206 may poll the recommendation service 204 continuously (e.g., repeatedly).

At block 226, the client may evaluate or re-evaluate the software updates that are available for its current software version, in view of the associated risk conditions, to determine which risk conditions are relevant to the client 206. The client 206 may continuously assess the latest available updates and risk conditions associated with each update at block 226, to inform its decision as to whether or not to perform an update.

In some examples, although not illustrated as such, the recommendation service 204 may initiate the communication by polling the client 206 for its current software version. In some examples, the recommendation service 204, or the client 206, or both, may initiate the operations 210 and 214, either periodically or on-demand.

In some examples, at operation 222, client 206 may share the available software updates and associated risk conditions with a client administrator 208. The client administrator 208 may select an update from among the available software updates and, at operation 220, provide the decision to client 206. The client may, at block 218, perform the update as instructed by the client administrator 208. In some examples, the client administrator 208 may delay updates until a later date, like a scheduled maintenance window. The client administrator 208 may instruct the client 206 to perform the update at a specified time and date, or wait until the specified time and date to provide instruction to the client 206 to install the update.

Additionally, or alternatively, the client 206 may be configured to automatically determine which software version to update to, as indicated by operation 228, and proceed to performing the software update at block 218. Operations 222 and 220 would be bypassed. For example, the client may review the available updates and associated conditions in view of its own attributes at operation 226. The client 206 may then automatically accept a software update recommendation immediately, or on a schedule, but without input from a human such as client admin 208. In some examples, the client 206 may inspect the available updates and, in response to determining that no adverse risk conditions are associated with a software update (e.g., to version 1.0.1), the client may automatically perform the update (e.g., to version 1.0.1). If, however, the client does detect a risk condition for a software update (as provided by recommendation service 204), then the client may involve the client administrator 208 at operations 222 and 220, to let a human select which software update to perform.

In some examples, a client administrator 208 may decide, regardless of the risk condition, to install the software update (e.g., to version 1.0.1). The client administrator 208 (or their delegated agent) can see that version 1.0.1 is not recommended for their cluster, and they can see that is because 'risk Condition A' matched an attribute of client 206. The administrator may see metadata that includes the matching risk (e.g., bug links, mitigation documents, etc.). The metadata may indicate a symptom, for example, that "machines with this update and these attributes may crash once a day". The administrator may decide to accept that risk and install the update, or to heed the warning and skip this update, or select a different software version update.

Figure 3:
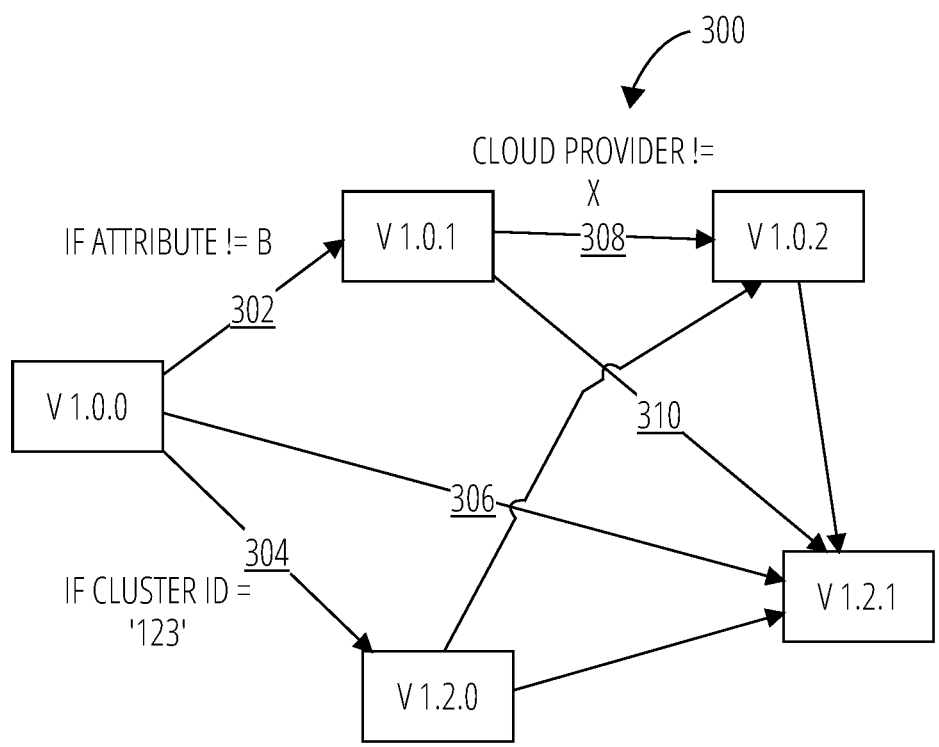
FIG. 3 shows an example of a recommendation for a software upgrade, in accordance with some embodiments.

FIG. 3 shows an example of a recommendation 300 for a software upgrade, in accordance with some aspects. Recommendation 300 may be provided by a recommendation service (e.g., recommendation service 106, 204, 404, or 626). In some examples, a risk database may store such a recommendation 300, as described. A recommendation service may refer to the recommendation 300 to obtain a recommendation for a given upgrade (e.g., all available software versions from version 1.0.0 and the conditions associated with each of those available versions). The recommendation service may share the result to a client.

In some examples, the recommendation 300 includes a graph with nodes and edges. Each edge may represent a software version, and edges may connect a first node to one or more second nodes, to indicate that a client may update from a first software version (represented by the first node) to one or more second software versions (represented by the one or more second nodes). Each edge may be associated with one or more conditions to indicate a risk condition, if such a risk condition exists. For example, a node may represent version 1.0.0. An edge 302 may join version 1.0.0 to version 1.0.1, thereby indicating that version 1.0.1 is an available software update for version 1.0.0. Further, a risk condition may be associated with this edge 302, that warns that this update (to version 1.0.1) may cause problems to a client, if attribute B pertains to the client. As such, a client with version 1.0.0 may decline updating to version 1.0.1 if they have attribute 'B'.

Further, edge 304 may connect version 1.0.0 to version 1.2.0, indicating that version 1.2.0 is also available as an update to version 1.0.0. A risk condition may be associated with edge 304 that recommends that a client perform this update, if it has a cluster ID of '123'. Thus, this may be a positive association. For example, version 1.2.0 may be a 'hotfix' or 'patch' to target issues that stem from cluster ID '123'. A developer may enter this condition with a risk database (e.g., risk database 202) or a recommendation service (e.g., recommendation service 204), or both, so that clients with this attribute (e.g., cluster ID '123') may find this positive association in the recommendation and perform the software update (e.g., to version 1.2.0) to address the known issue.

Further, edge 306 may connect to version 1.0.0 to version 1.2.1, indicating a third available software update. As discussed, a risk condition may be generated in response to client feedback, or from a user (e.g., a software developer), or a combination thereof. As such, some edges may have risk conditions, while others may not. The edge 306 may not have any risk conditions, due to the lack of client feedback, or the lack of specific instructions from a user, or both.

Further, the recommendation 300 may include additional software updates that are further downstream, e.g., beyond the immediately available software updates for a given client. For example, recommendation 300 may be provided to a client that has software version 1.0.0. In addition to version 1.0.1, version 1.2.0, and version 1.2.1, the recommendation may also include an edge 308 that connects version 1.0.1 to version 1.0.2, which is not directly available as an upgrade from version 1.0.0. Further, edge 308 may include one or more conditions associated with it. For example, edge 308 may include a warning that clients using cloud provider 'X' may experience adverse effects if updating to version 1.0.2. Thus, recommendation 300 may include software updates that are immediately downstream, as well as further downstream from the current software version of a given client. With such information, the client, or client administrator may analyze risks in advance, and plan out a software update path, while accounting for multiple edges and associated risk conditions. For example, a client may choose to take a different software update (e.g., version 1.2.0, or version 1.2.0) or take version 1.0.1 with the idea that they will skip version 1.0.2 and update directly to version 1.2.1 as indicated by edge 310.

Figure 4:
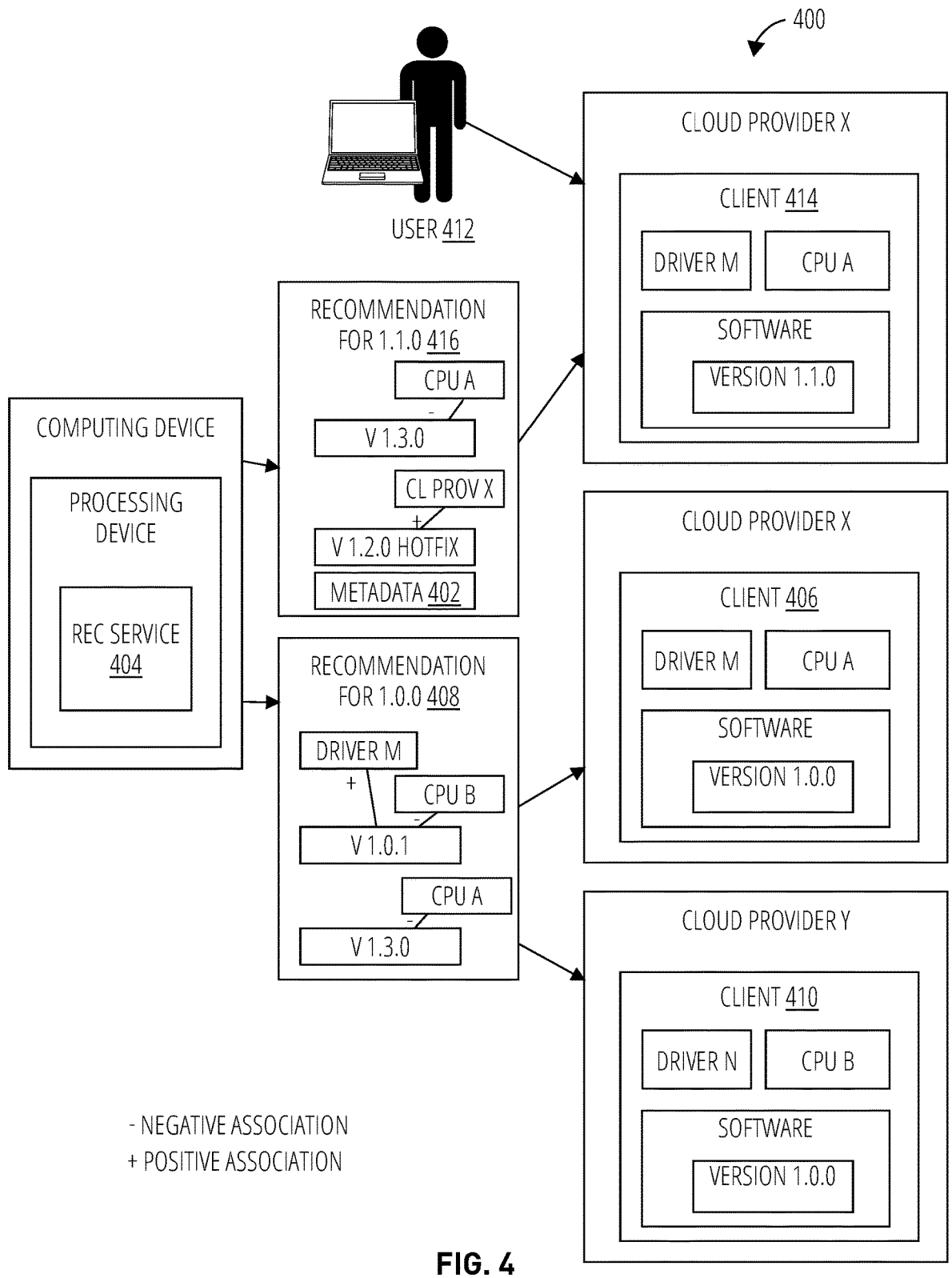
FIG. 4 shows a block diagram of an example system that may provide a recommendation for a software upgrade to multiple clients, in accordance with some embodiments.

FIG. 4 shows a block diagram of an example system 400 that may provide a recommendation for a software upgrade to multiple clients, in accordance with some embodiments. The example here may not correspond to examples in other figures.

A recommendation service 404 may obtain a version of software that is running on one or more clients, such as client 414, client 406, and client 410. Each client may have its own set of attributes and its own software version. For example, client 414 may have software version 1.1.0 installed. Client 406 and client 410 may both have software version 1.0.0 installed.

For each client, the recommendation service 404 may obtain a second version of the software which is an update to the version of software that is running on the client. For example, the recommendation service 404 may refer to a database (which may be managed by a risk database such as 202) to obtain the available software updates for version 1.1.0 and version 1.0.0. The recommendation service 404 may send recommendations to the clients with the available second versions and with one or more conditions that are associated with each second version, for the client to determine whether or not to update to the second version.

For example, the recommendation service 404 may determine that version 1.3.0 and version 1.2.0 are available to update from version 1.1.0. The recommendation service 404 may send a recommendation 416 having each available software version with associated conditions to client 414. Version 1.3.0 may be negatively associated with a CPU architecture 'A'. This risk condition may be formed as a result of client feedback. Version 1.2.0 may be positively associated with a cloud provider 'X'. This version 1.2.0 may be a 'hotfix' that targets issues with that are thought to be unique to that cloud provider.

Similarly, the recommendation service 404 may determine that versions 1.0.1 and version 1.3.0 are available for software version 1.0.0. The recommendation service 404 may send each of these available versions with associated conditions, to clients 406 and 410. Version 1.0.1 may be positively associated with a driver 'M', and negatively associated with a CPU architecture 'B'. As discussed, version 1.3.0 may be negatively associated with a CPU architecture 'A'.

As shown in this example, different clients may have divergent risk matching. For example, client 406 may have a CPU architecture 'A' while client 410 does not. Thus, client 406 may decide to skip version 1.3.0, to avoid experiencing a potentially negative response. Client 410, on the other hand, may assess the risk conditions in the recommendation 408, and upgrade to version 1.3.0, because it does not match the risk condition of CPU architecture 'A'.

Client 406 may opt to upgrade to version 1.0.1 in response to seeing that a positively associated condition (e.g., driver M) is matched. Given that client 406 does not have a CPU architecture 'B', client 406 does not see a risk with version 1.0.1, and may proceed to install version 1.0.1.

Any of the clients may opt to disregard a known risk and install an upgrade to a given version. As discussed, the client may notify an administrator, who may then select a version to upgrade to. For example, client 414 may wish to upgrade to version 1.3.0 even though it matches a risk condition of 'CPU architecture A'. Client 414 may present the options from recommendation 416, with each of the risk conditions, to a user 412. The user 412 may select version 1.3.0 and assume the possible risks. For example, the user 412 may want a new feature or behavior that is provided in version 1.3.0. Further, the user 412 may refer to metadata 402 that describes possible symptoms associated with this version 1.3.0 and 'CPU architecture A', and decide that these symptoms are worth the added feature or behavior of version 1.3.0. In some examples, a client may be configured to automatically select a version in view of the risk conditions. In some examples, a client may operate semi-automatically, by performing an update if no negative risk conditions are matched. If, however, a negative risk condition is matched, the client may ask user 412 to select the version.

As such, each client may locally evaluate the risk conditions in each recommendation (e.g., 416 or 408) to obtain tailored recommendations that are updated to reflect risk conditions known in the field. The recommendation service 404 may provide these recommendations without knowing and managing client-level details such as, for example: client 414 uses drivers N and M, is hosted on cloud provider X, has 'Y' number of nodes in its cluster, has an ambient temperature of 'L', with CPU architecture 'A', etc.

Figure 5:
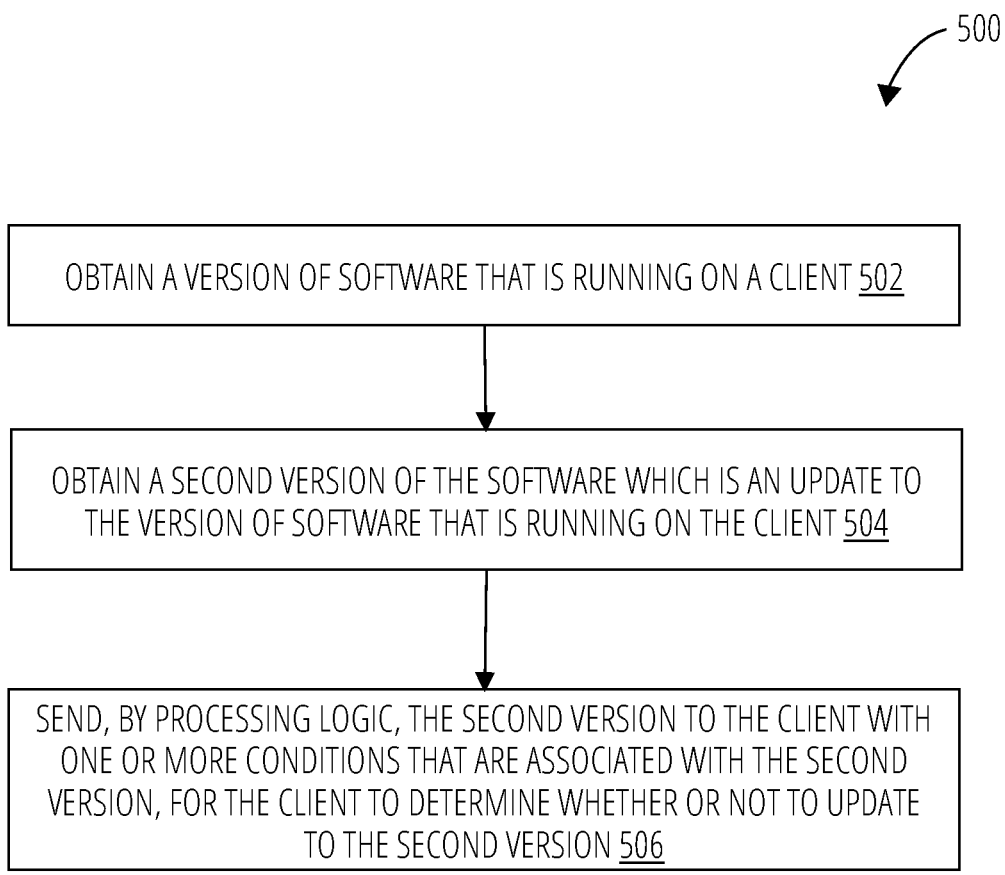
FIG. 5 illustrates an example method for providing conditional update recommendations based on local client attributes, in accordance with some embodiments.

FIG. 5 illustrates an example method 500 for providing conditional update recommendations based on local client attributes, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 5, method 500 illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in method 500 may be performed in an order different than presented, and that not all of the blocks in the method may be performed.

At block 502, processing logic may obtain a version of software that is running on a client. The software version may indicate a version number of a package of software that is running on the client. In some examples, the client may have a distributed software architecture. The client may be a microservices application with a plurality of microservices that work together to provide related functionality. Processing logic may obtain the version of software that is running on the client through a communication by the client (e.g., a poll message over a computer network). As described, processing logic may be performed by a server (e.g., recommendation service 106, recommendation service 204, recommendation service 404, etc.). In some examples, processing logic may extend to operations performed by the client, as described in other sections.

At block 504, processing logic may obtain a second version of the software which is an update to the version of software that is running on the client. For example, processing logic may obtain that a client is currently running version 1.0.0. Processing logic may reference a table, a database, or other data structure, to determine what software versions are available to update from version 1.0.0. This data structure, which may be managed by processing logic, may also include one or more conditions that are associated with each available update.

At block 506, processing logic may send the second version to the client with one or more conditions that are associated with the second version, for the client to determine whether or not to update to the second version.

In some examples, processing logic may extend to operations performed on the client. For example, processing logic on the client may update the software to the second version, in response to the one or more conditions not being present on the client. For example, if an available version has negatively associated conditions that do not match the client, then the client may go ahead and update its software to that version. If the one or more conditions do match the client, then the client may refrain from installing the upgrade. The client decision as to which software version to install may be performed automatically, or with involvement of a user, or a combination thereof, as described in other sections.

Figure 6:
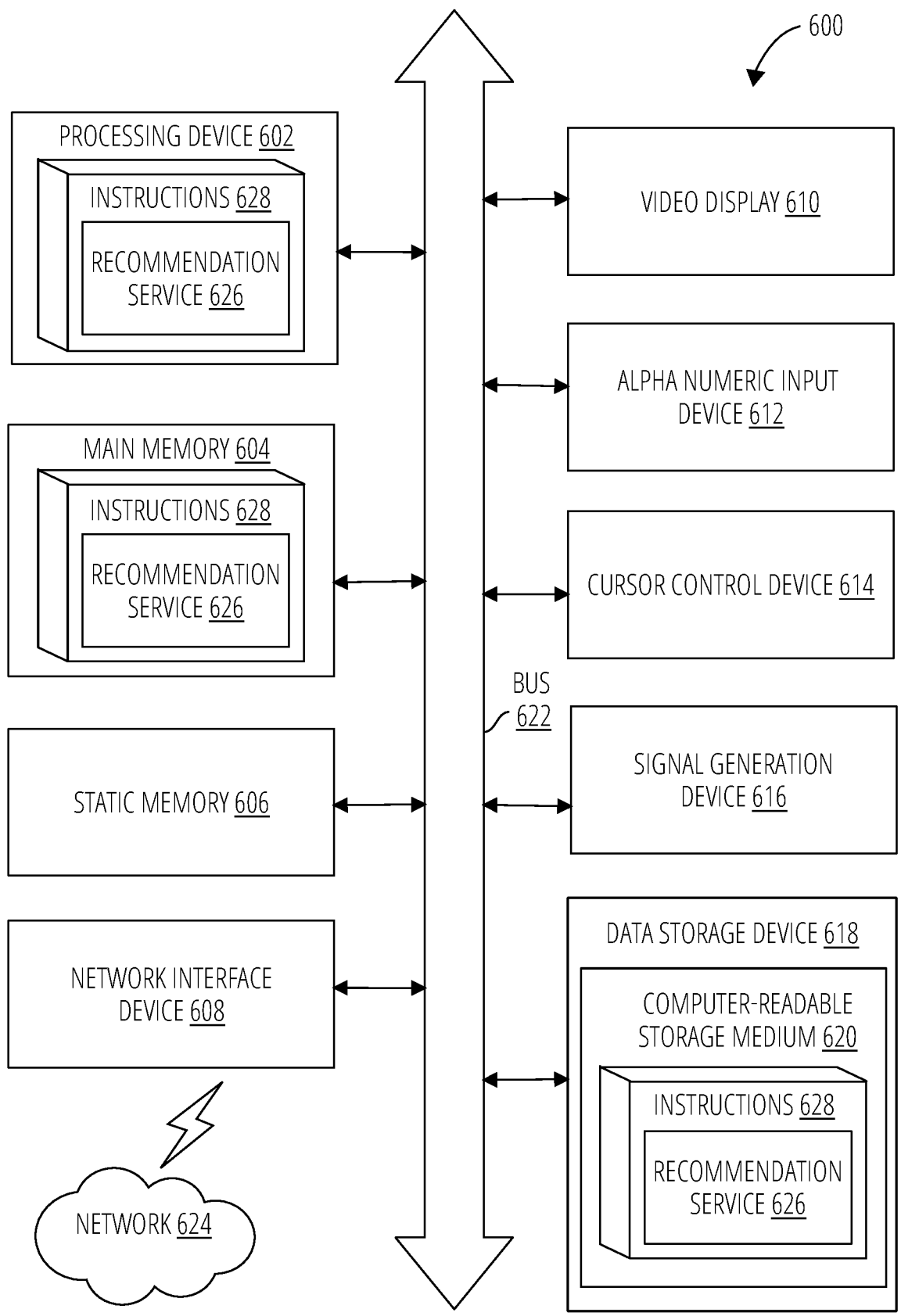
FIG. 6 is a block diagram of an example computing device that may perform one or more of the operations described herein, in accordance with some embodiments.

FIG. 6 is a block diagram of an example computing device 600 that may perform one or more of the operations described herein, in accordance with some embodiments. For example, the computing device 600 may provide software update recommendations with conditional risks to a client, for a client to use to determine which software version to update to.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device 602 (e.g., a general purpose processor, a PLD, etc.), a main memory 604 (e.g., synchronous dynamic random access memory (DRAM), read-only memory (ROM)), a static memory 606 (e.g., flash memory and a data storage device 618), which may communicate with each other via a bus 622.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 624. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 620 on which may be stored one or more sets of instructions 628 that may include instructions for a processing device (e.g., processing device 104), for carrying out the operations described herein, in accordance with one or more aspects of the present disclosure. Instructions 628 may also reside, completely or at least partially, within main memory 604 and/or within processing device 602 during execution thereof by computing device 600, main memory 604 and processing device 602 also constituting computer-readable media. The instructions 628 may further be transmitted or received over a network 624 via network interface device 608. The instructions 628 may contain instructions of a recommendation service 626 that, when executed, perform the operations and steps discussed herein.

While computer-readable storage medium 620 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending", "storing", "obtaining", "receiving," "routing," "updating," "providing," "determining", "generating", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component may be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 110, sixth paragraph, for that unit/circuit/component. Additionally, "configured to" or "configurable to" may include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   obtaining a current version of software that is running on a client, wherein the client comprises software components that are hosted on a plurality of network nodes of a platform provider, the plurality of network nodes forming a cluster;
   obtaining a graph comprising a plurality of nodes joined by respective one or more edges, wherein each node is associated with a respective version of the software and each of the respective one or more edges is associated with one or more conditions that are associated with migrating to the respective version of the software, wherein one of the plurality of nodes is associated with a second version of the software which is an update to the current version of software that is running on the client; and
   sending to the client over a network, by a processing device, data that is representative of the graph comprising the plurality of nodes and edges, the graph including the one of the plurality of nodes that is associated with the second version and the respective edge that is associated with the one or more conditions that are associated with migrating to the second version from the current version, wherein the data comprises the one or more conditions and the one or more conditions includes a risk condition associated with a number of network nodes that the client is hosted on and with the platform provider, for the client to traverse the graph and to determine, based on the number of network nodes in the cluster that the client is hosted on, and the platform provider that the client is hosted on, whether to update to the second version.

2. The method of claim 1, wherein the one or more conditions indicate a risk of updating to the second version if the one or more conditions are matched to the client.

3. The method of claim 1, wherein the one or more conditions indicate a benefit of updating to the second version if the one or more conditions are matched to the client.

4. The method of claim 1, further comprising sending the second version to the client with one or more additional versions and one or more additional conditions that are associated with the one or more additional versions.

5. The method of claim 1, wherein the one or more conditions includes a network node ID of the client.

6. The method of claim 1, wherein the one or more conditions includes a static attribute of the client.

7. The method of claim 1, wherein the one or more conditions includes a dynamic attribute of the client.

8. The method of claim 1, wherein the one or more conditions includes a CPU architecture of the client.

9. The method of claim 1, wherein the one or more conditions are set through user input.

10. The method of claim 1, wherein the client does not share client attributes with the processing device.

11. The method of claim 1, wherein the client updates the software to the second version, in response to the one or more conditions not being matched to the client.

12. The method of claim 1, wherein, in response to the one or more conditions being matched to the client, the client sends a notification to a user and receives a decision by the user that indicates whether the client is to perform an update to the second version.

13. A system comprising:
a memory; and
a processing device operatively coupled to the memory, the processing device to:
obtain a current version of software that is running on a client, wherein the client comprises software components that are hosted on a plurality of network nodes of a platform provider, the plurality of network nodes forming a cluster;
obtain a graph comprising a plurality of nodes joined by respective one or more edges, wherein each node is associated with a respective version of the software and each of the respective one or more edges is associated with one or more conditions that are associated with migrating to the respective version of the software, wherein one of the plurality of nodes is associated with a second version of the software which is an update to the version of software that is running on the client; and
send to the client over a network, by the processing device, data that is representative of the graph comprising the plurality of nodes and edges, the graph including the one of the plurality of nodes that is associated with the second version and the respective edge that is associated with the one or more conditions that are associated with migrating to the second version from the current version, wherein the data comprises the one or more conditions and the one or more conditions includes a risk condition associated with a number of network nodes that the client is hosted on and with the platform provider, for the client to traverse the graph and to determine, based on the number of network nodes in the cluster and the platform provider that the client is hosted on, whether to update to the second version.

14. The system of claim 13, wherein the one or more conditions indicate a risk of updating to the second version if the one or more conditions are matched to the client.

15. The system of claim 13, wherein the one or more conditions indicate a benefit of updating to the second version if the one or more conditions are matched to the client.

16. The system of claim 13, wherein the processing device is further to configure the apparatus to send the second version to the client with one or more additional versions and one or more additional conditions that are associated with the one or more additional versions.

17. A non-transitory computer-readable storage medium including instructions that, when executed by a processing device, cause the processing device to:
obtain a current version of software that is running on a client, wherein the client comprises software components that are hosted on a plurality of network nodes of a platform provider, the plurality of network nodes forming a cluster;
obtain a graph comprising a plurality of nodes joined by respective one or more edges, wherein each node is associated with a respective version of the software and each of the respective one or more edges is associated with one or more conditions that are associated with migrating to the respective version of the software, wherein one of the plurality of nodes is associated with a second version of the software which is an update to the current version of software that is running on the client; and
send to the client over a network, by the processing device, data that is representative of the graph comprising the plurality of nodes and edges, the graph including the one of the plurality of nodes that is associated with the second version and the respective edge that is associated with the one or more conditions that are associated with migrating to the second version from the current version, wherein the data comprises the one or more conditions and the one or more conditions includes a risk condition associated with a number of network nodes that the client is hosted on and with the platform provider, for the client to traverse the graph and to determine, based on the number of network nodes in the cluster and the platform provider that the client is hosted on, whether to update to the second version.

18. The non-transitory computer-readable storage medium of claim 17, wherein the one or more conditions indicate a risk of updating to the second version if the one or more conditions are matched to the client.

19. The non-transitory computer-readable storage medium of claim 17, wherein the one or more conditions indicate a benefit of updating to the second version if the one or more conditions are matched to the client.

20. The non-transitory computer-readable storage medium of claim 17, wherein the processing device is further to send the second version to the client with one or more additional versions and one or more additional conditions that are associated with the one or more additional versions.

* * * * *